Feb. 26, 1924.

H. C. FORD 1,484,823

CALCULATING INSTRUMENT

Filed Feb. 24, 1921     4 Sheets-Sheet 1

Fig.1.

Hannibal C. Ford, Inventor

By his Attorneys

Moakley and Gill.

H. C. FORD

1,484,823

CALCULATING INSTRUMENT

Filed Feb. 24, 1921    4 Sheets-Sheet 4

Hannibal C. Ford, Inventor
By his Attorneys
Moakley and Gill.

Patented Feb. 26, 1924.

1,484,823

UNITED STATES PATENT OFFICE.

HANNIBAL C. FORD, OF JAMAICA, NEW YORK.

CALCULATING INSTRUMENT.

Application filed February 24, 1921. Serial No. 447,452.

*To all whom it may concern:*

Be it known that I, HANNIBAL C. FORD, residing at Jamaica, in the county of Queens, State of New York, have invented certain new and useful Improvements in Calculating Instruments; and I do hereby declare the following to be a full, clear, and exact description of the invention, such as will enable others skilled in the art to which it appertains to make and use the same.

This invention relates to calculating instruments and particularly to an instrument for use in connection with naval guns, known as a deflection converter.

The deflection between two relatively moving objects, such as two ships, is their rate of movement at right angles to the line of sight between the two ships and is usually given in terms of knots per hour. It has become general practice to convert this deflection into the angle through which a gun must be displaced from the line of sight to correct for the distances the two ships will move during the time that it takes a projectile to pass from one ship to the other, depending upon the range between the ships. A further correction to take care of the drift of the projectile for the particular range is also introduced.

For the purpose of indicating this arbitrary deflection a scale has been devised which has for its unit of measurement a "mil" which is an angle whose tangent is .001. This arbitrary deflection scale is usually adjusted so that 50 corresponds to the line of sight and all readings below 50 indicate that the gun is to be swung to the left while all readings above 50 indicate that the gun is to be swung to the right.

The manner in which this scale has heretofore been used is illustrated and described in the Patent No. 1,332,210 granted to me on March 2, 1920. A chart is prepared on which a number of curves corresponding to the drift curves of projectiles for various actual deflections are plotted with ranges as ordinates and mils, or arbitrary deflection units, as abscissas. In using the chart the curve corresponding to the actual deflection is selected and a point upon the curve corresponding to the range between the ships is located. The abscissa of this point, read to the closest division of the chart, is then the arbitrary deflection. The gun is then corrected by angularly displacing it an equivalent amount to thereby correct for the time of flight of the projectile as well as for its drift.

In the patent there is shown an instrument particularly adapted for determining angular or arbitrary deflection, and which is in effect a device for indicating the values of the different abscissas or ordinates of the different points upon any one of a series of curves having substantially the same curvature, but which occupy different positions with respect to the axes of abscissas or ordinates.

The instrument comprises a gear which may be displaced through equal angles for equal changes in actual deflection. Cooperating with the gear is a sector which is provided with a slot having a curvature corresponding to that of the drift curves, all of which have substantially the same curvature so that a single cam slot may be utilized to represent each one of them. Sliding in the cam slot is a pin which is mounted upon a traveling block which may be displaced by rotating a screw shaft which passes through the block, the screw shaft, block and pin being carried in a slot in a link which is connected to a second sector having associated therewith a dial for indicating in units of arbitrary deflection the correction which should be applied to the gun. The block is arranged to be displaced proportionally to the range by means of a shaft connected to a suitable handle and having associated therewith a range counter.

Instruments having the general structural details of that shown in the patent referred to above, have been used in connection with range keepers of the type shown in my copending application, Serial No. 280,150, filed March 1, 1919, and which are particularly intended for use with guns of large calibre, such apparatus being known in the United States Navy as Mark I, range keeper. In attempting to apply the instruments to range keepers of the type shown in my Patent No. 1,370,204 granted March 1, 1921, which is particularly intended for use in connection with small calibre guns, difficulty was experienced on account of the space occupied by the gear sectors, and other associated parts of the mechanism.

The present invention has therefore for its principal objects the production of an instrument in accordance with the said Patent No. 1,332,210, but which shall be particularly adapted for use in conjunction with range keepers of the type shown in my Patent No. 1,370,204, and to otherwise improve and simplify the structure of the device and render it more compact.

The range keeper of my Patent No. 1,370,-204, is provided with a deflection dial surrounded by a correction ring which may be moved with respect to a fixed zero point by means of a shaft geared to the ring and provided on the exterior of the casing with a knob by which it may be turned.

In accordance with the present invention, I place the elements of the deflection converter within a casing adapted to be attached to the casing of the range keeper with which the instrument is intended to be used, and I substitute for the knob for actuating the correction ring, a gear wheel which is engaged by a gear wheel at the end of a train of gears which is adapted to be actuated by a knob on the exterior of the casing of the deflection converter, the arrangement being such that by turning the knob the correction ring may be moved to keep its index mark or zero in registry with the index mark or zero of the deflection dial after the manner of a follow-the-pointer mechanism.

Operatively connected to one of the gears of the gear train by means of a rack bar is a reciprocating member connected to a slotted arm which is pivoted to the frame of the instrument. A member provided with a curved slot corresponding to the drift curve of a projectile is mounted on a reciprocating rack bar which is connected by means of a gear train to a drum or dial graduated in units of arbitrary deflection. Fitting within the drift curve slot is a pin projecting from a guide member which is slidably mounted upon a bar adapted to be moved in accordance with the range by means of a suitable knob on the outside of the casing, an indicating drum or dial being provided to enable these parts of the deflection converter to be set in accordance with the indication of the range keeper with which the instrument is associated. The pin which fits within the drift curve slot also extends through the slot of the arm which is adapted to be moved by the gear train connection to the correction ring of the range keeper. It follows from this construction that the member provided with the drift curve may be shifted laterally by this arm in accordance with the deflection and also may be shifted in accordance with the range by the movement of the bar, so that the indication given by the dial or drum of the instrument is the arbitrary deflection which must be given to the gun for the given actual deflection and range. If either of the quantities be changed, the indication of the instrument will be changed to show the arbitrary deflection in accordance with the value which would be obtained from a chart having the drift curves plotted in the manner illustrated and described in my Patent, No. 1,332,210.

In order that a spotting correction may be introduced when necessary there is associated with the arbitrary deflection drum or dial a second drum or dial carrying the zero mark for the main drum. The second drum may be turned by means of a shaft provided on the outside of the casing with a suitable knob. A differential gear connection is placed between the two drums so that when the drum carrying the zero point is moved in accordance with the spotting correction which should be applied, a slight movement of the arbitrary deflection drum will be produced to cause the reading of the latter with respect to the zero point of the second drum to indicate the final arbitrary deflection which should be applied to the gun to take care of the spotting correction. The spotting correction mechanism is provided with a detent device whereby the amount of movement imparted to the spotting correction drum may be conveniently determined by feeling the number of steps passed over by the detent as the knob of the spotting correction mechanism is turned, thus rendering it unnecessary for the operator to watch the spotting correction drum to determine the amount by which it is turned.

The particular nature of the instrument as well as other objects and advantages of the present invention will appear more clearly from a description of a preferred embodiment as shown in the accompanying drawings in which—

Figure 1:
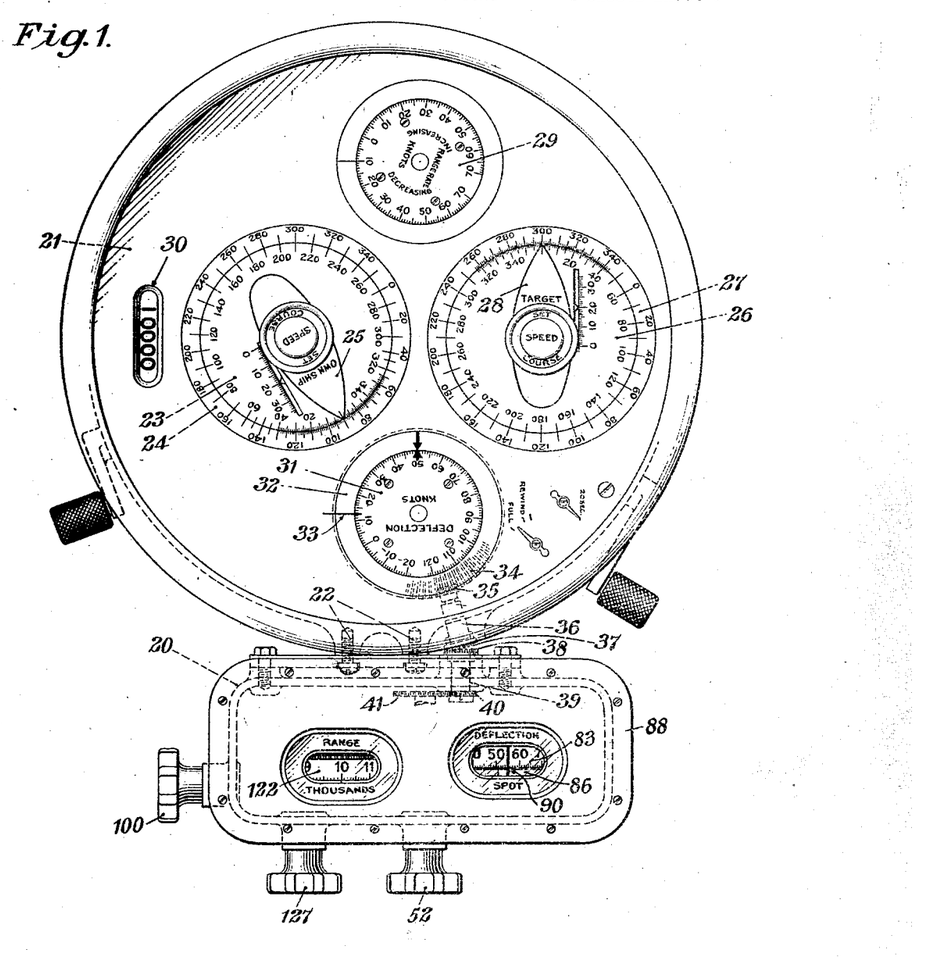
Fig. 1 is a plan view of the instrument and a range keeper with which it is associated.

In the drawings in which similar reference characters denote similar parts throughout the several views, 20 indicates the casing of the instrument, which is adapted to be attached to the cylindrical casing of a range keeper 21 by means of bolts 22. The range keeper forms the subject matter of my Patent No. 1,370,204, and will not be described in detail herein since its elements form no part of the present invention. The face plate of the range keeper carries a ship dial 23 and a ship compass course ring 24, which parts may be rotated separately or together. The ship dial carries a pointer 25 representing the ship. The face plate is also provided with a target dial 26 surrounded by a compass course ring 27 and having a pointer 28 representing the target. The face plate is also provided with a dial 29 for indicating the rate of change of range. The range is read from a range counter 30, the numbers appearing through an opening in the face plate of the instrument. The face plate is also provided with a deflection dial 31 which is surrounded by a movable correction ring 32 having a suitable index mark represented on the drawing as an arrow. A fixed index mark or zero point 33 is provided for the deflection dial, this mark preferably being in the form of a member attached to the face plate 21 and extending over the correction ring 32. Attached to the lower face of the correction ring is an annular rack 34 which is engaged by a bevel pinion 35 on the end of a shaft 36 passing through a suitable bearing in the casing of the range keeper.

In accordance with the present invention a gear 37 is substituted for the knob which is attached to the outer end of the shaft in the range keeper shown in my Patent No. 1,370,204. The gear 37 meshes with a gear 38 mounted upon a shaft 39 passing through a suitable bearing in the casing 20 of the deflection converter. The inner end of shaft 39 is provided with a gear 40 meshing with a gear 41 on the end of a shaft 42 mounted in parallel frame plates 43 and 44. The frame plates are held in spaced relation by members 45 provided at their ends with screws threaded into sleeves 47 which are held in place by screws 46 passing through the casing. The frame plate 43 is additionally supported by means of transverse rods 48 extending between opposite sides of the casing 20.

The end of the shaft 42 opposite to that to which the gear 41 is attached, is provided with a gear 49 which meshes with a pinion 50 on the inner end of a shaft 51 passing through a bearing in the casing 20 and carrying at its outer end a knob 52 by which the shaft may be rotated to rotate the shaft 42. Through the gears 41 and 40, shaft 39, and gears 38 and 37, the correction ring 32 may be moved to keep its index mark in registry with the index mark of the deflection dial 31 after the manner of a follow-the-pointer mechanism.

The portion of the shaft 42 lying between the frame plates 43 and 44 is screw threaded as at 53 and carries a traveling nut 54 slidably mounted on a guide 55 extending between the frame plates. The nut is provided on each side with a projection 56 adapted to be engaged by a pin 57 carried by the shaft 42, when the nut reaches its corresponding limit of movement. The arrangement thus provides a pair of stops for limiting the rotation of the shaft 42 in each direction as it is turned by the knob 52.

Adjacent the gear 41, the shaft 42 is provided with a pinion 58 engaging a rack 59 provided at each end with a pair of lugs 60, the inner faces of which are provided with channels fitting over the edges of a horizontal guide rail 61 mounted upon and parallel to the frame plate 43 by means of posts 62. The rack 59 is provided with a pin 63 extending into the slot 64 of an arm 65 pivotally mounted as at 66 to the frame plate 43.

The frame plate 43 is provided with a horizontal slot 67, (see Fig. 3), which serves as a guide for a rack bar 68 provided at its ends with lugs 69 passing through the slot. The rack bar 68 carries a plate 70 provided with a slot 71 having a curvature corresponding to the drift curve of a projectile of the gun with which the instrument is adapted to be used. This drift curve corresponds to the central one of the curves of the charts shown in Figs. 1 and 2 of my Patent No. 1,332,210 referred to above, this particular curve being the one corresponding to zero deflection. Cooperating with the rack bar 68 is a pinion 72 on a shaft 73 mounted between the frame plates of the instrument. This shaft carries a gear 74, (see Fig. 4), which meshes with a gear 75 attached to the hub of a gear 76 loosely mounted upon a shaft 77 extending between the frame plates 43 and 44. (See Figs. 7, 8, 9, and 10.) Attached to the shaft 77 is a spider 78 provided at opposite ends with extensions forming frames 79 within each of which is mounted a pair of pinions 80 and 81 meshing with each other. Attached to one side of the frame 79 is a web 82 of a drum 83 provided upon its outer face with graduations representing units of arbitrary deflection. The particular apparatus shown herein is based upon an arbitrary deflection scale in which the line of sight is represented by 100 instead of by 50 as in the usual scale.

The two pinions 80 of each pair of pinions within the frames 79 mesh with the gear 76, while the other pinions 81 mesh with a gear 84 mounted to turn freely upon the shaft 77 and having a hub upon which is loosely mounted the web 85 of a spotting correction drum 86. The drum is held in place upon the hub by a spring disc 87, thus permitting the drum to be turned upon the hub for purpose of adjustment. The two drums 83 and 86 may be viewed through a window in the cover 88 of the instrument. A bezel 89 attached to the inner face of the cover holds the pane of the window in place with a suitable gasket around the edge of the pane. Extending across the window is a suitable index line 90 which may be a wire attached to the bezel or a line etched upon the glass of the window pane.

The hub of the gear 84 carries a pinion 91 which is engaged by a worm 92 on the inner end of a shaft 93 mounted in suitable bearings 94 attached to the frame plate 44. The outer end of shaft 93 is provided with a disk 95 having a radial slot 96 adapted to receive a pin 97 projecting from a detent 98 attached to the inner end of a shaft 99 passing through a bearing in the casing 20 and carrying at its outer end a knob 100.

Figure 4:
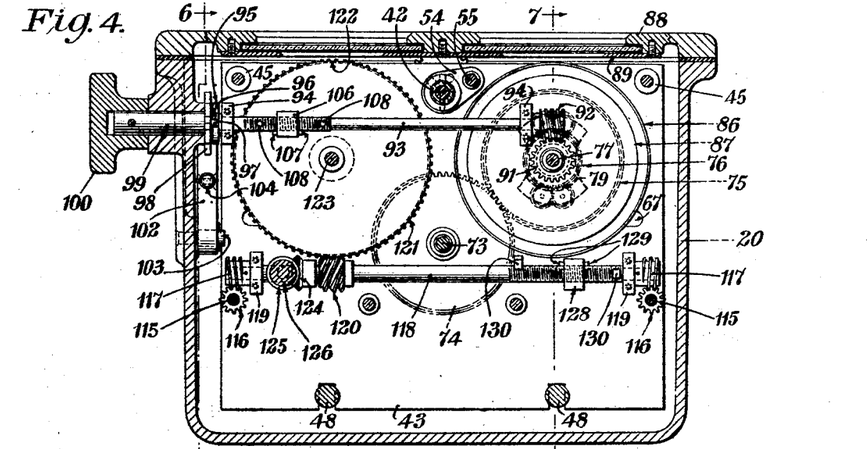
Fig. 4 is a similar elevation along the line 4—4 of Fig. 2.

Cooperating with the detent 98 is a roller 101 (see Figs. 2 and 6) on the end of an arm 102 pivotally mounted, as at 103, upon the inner face of the casing 20, as shown most clearly in Fig. 4. The roller 101 is held in engagement with the detent by means of a spring 104 connected between the arm 102 and a pin 105 projecting from the inner face of the casing 20.

The shaft 93 is provided with stop mechanism similar to that shown in connection with the shaft 42 and consisting of a traveling nut 106 having one face in contact with the frame plate 44 to prevent it from turning. The nut is provided on opposite faces with pins 107, each of which is adapted to engage a lug 108 projecting from the shaft 93, when the nut reaches its limit of movement.

Figure 5:
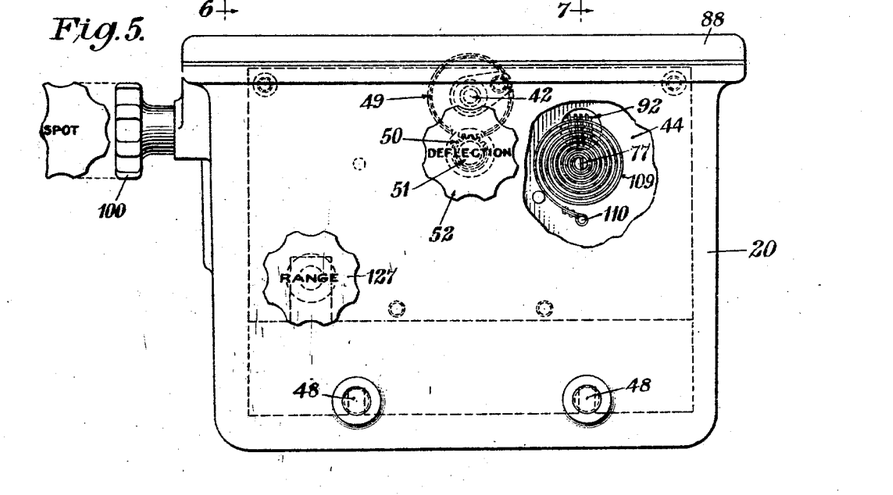
Fig. 5 is a front elevation of the instrument with the casing partially broken away to show certain internal parts of the mechanism.
Figures 6, 7:
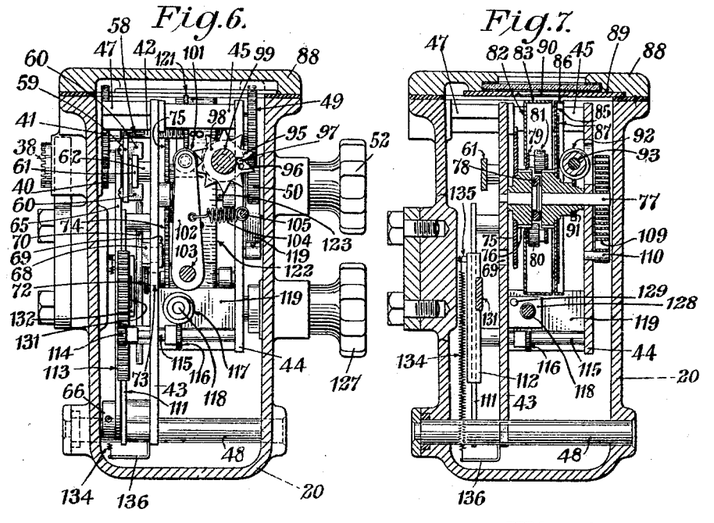
Fig. 6 is a transverse sectional elevation along the line 6—6 of Fig. 4.
Fig. 7 is a similar elevation along the line 7—7 of Fig. 4, and Figs. 8, 9, and 10 are respectively front, top, and side views of the differential gear of the deflection indicator of the instrument.
Figure 8:
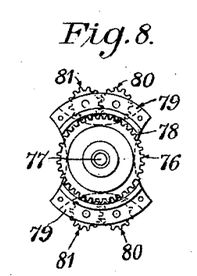
Figure 9:
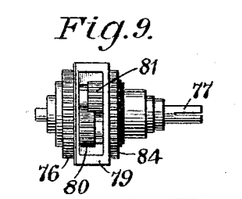
Figure 10:
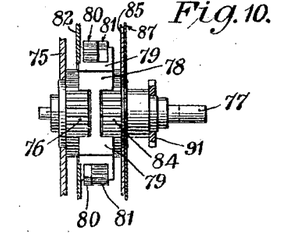

As shown most clearly in Figs. 5 and 7, the shaft 77 is extended through the frame plate 44, and attached thereto is one end of a coiled spring 109, the other end of which is attached to a pin 110 projecting from frame plate 44. This spring is for the purpose of taking up any back-lash, or lost motion, in the gears associated with the deflection drum 83 and the spotting correction drum 86.

Mounted parallel to the outer face of the frame plate 43 upon suitable posts is a pair of vertical guides or rails 111, (see Fig. 3), each of which carries a slidable member 112 provided with a rack 113 meshing with a pinion 114 on a shaft 115 extending through the frame plate 43, and supported at its other end in the frame plate 44.

The shafts 115 carry, between the frame plates, pinions 116 meshing with worms 117 at the ends of a shaft 118 mounted in members 119 extending between the frame plates 43 and 44. The shaft 118 is provided with a third worm 120 meshing with a gear 121 having connected thereto a drum 122 provided on its outer face with graduations corresponding to units of range, and adapted to be viewed through a window in the cover 88 and bezel 89, as shown most clearly in Fig. 1. A suitable index mark placed at one edge of the opening in the bezel serves as a zero point for the range drum. The gear 121 and drum 122 are mounted upon a shaft 123 extending between the frame plates 43 and 44.

Figure 2:
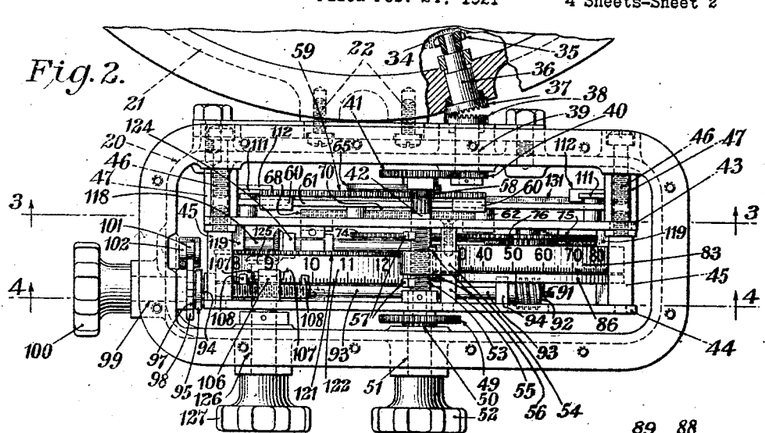
Fig. 2 is an enlarged plan view of the instrument with the cover and bezel removed.

As shown most clearly in Figs. 2 and 4, the shaft 118 is provided with a miter gear 124 meshing with a corresponding gear 125 on the end of a shaft 126 extending through the casing 20 and carrying at its outer end a knob 127 by which it may be turned. The shaft 118 is provided with a stop mechanism consisting of a traveling nut 128, one face of which engages the frame plate 43 to prevent the nut from turning. On each side of the nut is a pin 129 adapted to be engaged by a lug 130 projecting from the shaft 118, when the nut 128 reaches its corresponding limit of movement.

Figure 3:
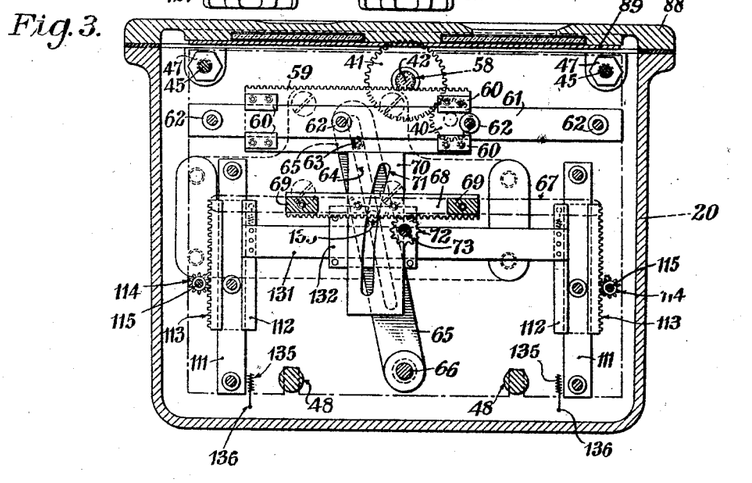
Fig. 3 is a longitudinal sectional elevation along the line 3—3 of Fig. 2.

Referring particularly to Fig. 3, the members 112 are connected by a horizontal bar 131 upon which is mounted a slide 132 provided with a pin 133 which projects from one side of the slide into the slot 64 in the arm 65, and on the other side of the slide into the drift curve slot 71 in the plate 70.

For the purpose of taking up any back-lash, or lost motion, between the racks and pinions 113 and 114 and the gears associated therewith, a spring 134 (see Fig. 7) is associated with each of the slidable members 112, each spring being attached at one end to a pin 135 projecting from the corresponding member and at the other end to a bracket 136 attached to the frame plate 43.

In the use of the combined range keeper and deflection converter described above, one operator manipulates the range keeper and applies the spotting correction to the deflection converter in accordance with the directions received from the spotting officer. On account of the detent mechanism associated with the shaft 93 of the spotting correction mechanism, the amount of movement imparted to this shaft may be determined by feeling the number of points of the detent 98 which pass over the roller 101 as the knob 100 is turned. The actual deflection between the ship upon which the instrument is mounted and the target is shown at all times by the displacement of the zero point of the deflection dial 31 from the index mark 33. In the range keeper shown herein, the zero point of the deflection dial is at the point marked 50 on its scale and all readings below 50 indicate that the gun is to be swung to the left and all readings above 50 indicate that it is to be swung to the right.

A second operator manipulates the knob 52 to keep the index mark of the correction ring 32 opposite the zero mark of the deflection dial 31, this movement being transmitted from the knob to the correction ring by means of the shaft 51, gears 50 and 49, shaft 42, gears 41 and 40, shaft 39, gears 38 and 37, shaft 36, pinion 35, and rack 34 attached to the correction ring. As the shaft 42 turns, the pinion 58 thereon will cause the rack 59 to be moved along the rail upon which it is carried. This movement of the rack will, through the pin and slot connection 63 and 64, swing the arm 65 about its pivot 66. This movement of the arm will, through the pin 133, cause the slide 132 to be moved along the bar 131 upon which it is mounted, and at the same time the plate 70, provided with the drift curve slot 71, will be moved laterally. This setting of the elements of the instrument in accordance with the angular deflection as indicated by the range keeper is equivalent to selecting the particular curve of the chart shown in Patent No. 1,332,210, corresponding to the given actual deflection as measured along the abscissa of the chart.

In addition to the operations described above which amount to the selection of the particular curve corresponding to the given actual deflection, it is necessary to determine the point on the curve corresponding to the particular range of the target. In other words, the point of intersection of the ordinate corresponding to this range with the curve corresponding to the actual deflection must be determined. This determination is made by the operator of the deflection converter by setting the range drum to correspond to the indications of the range keeper as called to him by the operator of the latter instrument. By means of the knob 127, shaft 126 and gears 125 and 124, the shaft 118 is turned to cause the range drum 122 to be moved in accordance with the directions received from the operator of the range keeper. At the same time the members 112 will be moved along their guides 111 by means of the worms 117, pinions 116, shafts 115, pinions 114, and racks 113. This movement of the members 112 will be accompanied by a corresponding movement of the bar 131 which will move the pin 133 carried by the slide 132 along the slot 64 in the arm 65. At the same time the pin will move through the drift curve slot 71, but, since the latter lies at an angle to the slot 64, a lateral displacement of the plate 70, within which the drift curve slot is placed, will result. The movement of the plate 70, under the combined effect of the movement imparted to it by the swinging of the arm 65 in accordance with the actual deflection and its displacement due to the movement of the pin 133 in accordance with the range, will produce a corresponding displacement of the rack 68, connected to this plate. Through pinion 72, shaft 73, gears 74, 75, 76 and pinion 80 carried by spider 78 the drum 83 will be displaced to show the arbitrary deflection in mils based upon a scale having its zero point at the graduation marked 100 on the drum, corresponding to the given actual deflection and range for which the instrument has been set and the drift of the projectile.

By the provision of the differential connection between the arbitrary deflection drum 83 and the spotting correction drum 86, the deflection drum may be displaced in accordance with the spotting correction which should be applied independently of the gear connections to the rack bar 68. Rotation of the gear 91, by means of the pinion 92, and shaft 93 to which the spotting correction knob 100 is attached, will, through gear 84 and pinions 81, cause the spider 78 to be swung in one direction or the other with respect to the gear 76 around which the pinions 80 will travel as idlers.

The coil spring 109 acting upon the shaft 77, which carried the spider 78, will tend to draw all of the movable parts, such as the gears and shafts, in one direction and thus take up any back-lash, or lost motion, between the gear teeth and other relatively moving parts. The same is true of the springs 134 connected to the members 112 which are moved in accordance with changes in the range, the action of the springs being transmitted back as far as the worms 117 on the operating shaft 118.

In the embodiment of the invention shown herein the correction ring 32 of the range keeper and the parts of the deflection converter connected thereto are arranged to be operated manually by means of the knob 52, but if desired these parts of the converter may be operated automatically from the deflection dial 31 of the range keeper in any suitable manner as, for instance, by locking the correction ring 32 to the dial so that it will move with the latter.

It will also be understood that the instrument of the invention is equally well adapted for use with other types of range keepers than that shown herein, and, in fact, by appropriate changes in the details of construction, it may be used for indicating the values of the different abscissas or ordinates of different points upon any one of a series of curves or graphs having substantially the same curvature or shape, but which occupy different positions with respect to the axes of abscissas and ordinates, the terms "curves" or "graphs" being used herein in the usual sense as including either straight or curved lines plotted with respect to coordinate axes. Various changes in the structural details of the instrument may also be made without departing from the principle of the invention as defined in the appended claims.

I claim:

1. In a calculating instrument, the combination of a cam member having the shape of a curve of a chart plotted with respect to mutually perpendicular coordinate axes, means movable parallel to one of the coordinate axes for moving the cam member in accordance with one coordinate of a point on the chart, means movable parallel to the other coordinate axis for moving said means to a position corresponding to another coordinate of the point on the chart, and means for indicating the resultant movement of the cam member.

2. In a calculating instrument, the combination of a cam having the general curvature of a curve of a chart plotted with respect to mutually perpendicular coordinate axes, and mounted to move parallel to one of the axes, means movable parallel to the same axis for moving the cam in accordance with one coordinate of a point on the chart, a part having a sliding engagement with the cam and adapted to move the latter, means movable parallel to the other coordinate axis for displacing the part to a position corresponding to another coordinate of a point of the curve, and means for indicating the resultant movement of the cam member.

3. In a calculating instrument, the combination of a cam member having the general curvature of a curve of a chart plotted with respect to mutually perpendicular coordinate axes, a slidable member, a connection between the cam member and the slidable member, a guide for the slidable member, means for displacing the cam member in accordance with one coordinate of a point on the chart, means for moving the guide to displace the slidable member in accordance with another coordinate of a point on the chart to shift the cam member accordingly, and means for indicating the resultant displacement of the cam member.

4. In a calculating instrument the combination of a cam member having the general curvature of a curve of a chart plotted with respect to mutually perpendicular coordinate axes, a slidable member, a connection between the cam member and the slidable member, a guide for the slidable member, means for displacing the cam in accordance with one coordinate of a point on the chart, means for moving the guide to displace the slidable member in accordance with another coordinate of the point on the chart to shift the cam member accordingly, a rack bar connected to the cam member, a pinion cooperating with the rack bar, means for indicating the resultant displacement of the cam member, and operating connections between the pinion and the indicating means.

5. In a calculating instrument, the combination of a member provided with a slot having the general curvature of a curve of a chart plotted with respect to mutually perpendicular coordinate axes, a slotted arm, a pin connected between the slotted member and the arm, means for swinging the arm to displace the cam member in accordance with one coordinate of a point on the chart, means for shifting the pin within the slot in the arm in accordance with another coordinate of the point on the chart to produce an additional displacement of the slotted member, and means for indicating the resultant displacement of the slotted member.

6. In a calculating instrument, the combination of a plate provided with a slot having the general curvature of a curve of a chart plotted with respect to mutually perpendicular coordinate axes, a slidable member, a guide member, a slotted arm, a pin attached to the slidable member and extending into the slots in the plate and arm, means for swinging the arm to displace the plate in accordance with one coordinate of a point on the chart, means for displacing the slidable member in accordance with another coordinate of a point on the chart to cause additional displacement of the plate, and means for indicating the resultant displacement of the plate.

7. In a calculating instrument, the combination of a casing, a member provided with a slot having the general curvature of a curve of a chart plotted with respect to coordinate axes, an arm, a connection between the arm and the slotted member, means for swinging the arm to displace the slotted member in accordance with one coordinate of a point on the chart, means for displacing the slotted member in accordance with another coordinate of a point on the chart, means for indicating the resultant displacement of the slotted member, a correction device associated with the indicating means, a shaft operatively connected to the correction device, a knob mounted on the outside of the casing, a detachable connection between the knob and the shaft, and a detent mechanism associated with the knob for use in determining the setting of the correction device.

8. In a calculating instrument, the combination of a casing, a frame detachably mounted within the casing, a shaft mounted in the frame, a member provided with a slot having the general curvature of a curve plotted with respect to mutually perpendicular coordinate axes, operative connections between the shaft and the slotted member for displacing the latter in accordance with one coordinate of a point on the chart, a member operatively connected to the slotted member, means for displacing the member in accordance with another coordinate of the point on the chart for which the slotted member has been set, and means operatively connected to the slotted member for indicating the position resulting from its displacement.

9. In a deflection converter for use with a range keeper provided with means for indicating actual deflection, the combination of a cam member having the general curvature corresponding to the drift curve of a projectile plotted with respect to mutually perpendicular coordinate axes, a mounting for the member arranged to permit the member to move parallel to one of the coordinate axes, means for moving the cam member to occupy a position corresponding to the curve of a particular actual deflection, means movable parallel to the other coordinate axis for moving said means to a position corresponding to the range as indicated by the range keeper, and means actuated by the resultant movement of the cam member for indicating the arbitrary deflection corresponding to the given actual deflection and range.

10. In a deflection converter for use with a range keeper provided with means for indicating actual deflection, the combination of a casing adapted to be attached to the range keeper, a frame detachably mounted within the casing, a cam member mounted on the frame and having the shape of a drift curve of a projectile, a pivoted arm, means for displacing the cam member in accordance with the actual deflection as shown by the deflection indicating means of the range keeper, means for displacing the cam member in accordance with the range as indicated by the range keeper, means for indicating the resultant displacement of the cam member in terms of arbitrary deflection, a spotting correction device associated with the arbitrary deflection indicating means, means for actuating the spotting correction device from the exterior of the casing comprising a detachable connection to permit the elements mounted within the casing to be removed therefrom, and a detent mechanism associated with the parts of the actuating mechanism carried by the casing for use in determining the setting of the correction device.

11. In a calculating instrument, the combination of a casing, a cover for the casing provided with windows, a frame, a shaft mounted in the frame, a cam member having the general curvature of a curve of a chart plotted with respect to coordinate axes, a slidable member to which the cam member is connected, an arm pivoted to the frame, a connection between the arm and the slidable member, a connection between the arm and the shaft, means for rotating the shaft to swing the arm and displace the cam member in accordance with one coordinate of a point on the chart, means whereby the slidable member may be displaced in accordance with another coordinate of a point on the chart, a drum adapted to be viewed through one of the windows for indicating the displacement of the cam member caused by the last named displacement of the slidable member, and a second drum adapted to be viewed through the other window for indicating the resultant displacement of the cam member due to both displacements of the slidable member.

12. In a calculating instrument, the combination of a casing, a cover for the casing provided with windows, a frame, a shaft mounted in the frame, a cam member having the general curvature of a curve of a chart plotted with respect to coordinate axes, a slidable member to which the cam member is connected, an arm pivoted to the frame, a connection between the arm and the slidable member, a connection between the arm and the shaft, means for rotating the shaft to swing the arm and displace the cam member in accordance with one coordinate of a point on the chart, means whereby the slidable member may be displaced in accordance with another coordinate of a point on the chart, a drum adapted to be viewed through one of the windows for indicating the displacement of the cam member caused by the last named displacement of the slidable member, a second drum adapted to be viewed through the other window for indicating the resultant displacement of the cam member due to both displacements of the slidable member, and a correction drum associated with the last named drum and adapted to be viewed through the same window.

13. In a calculating instrument, the combination of a cam member having the general curvature of a curve of a chart plotted with respect to coordinate axes, means for moving the cam member in accordance with one coordinate of a point on the chart, means for displacing the cam member in accordance with another coordinate of a point on the chart, a rack attached to the cam member, a pinion cooperating with the rack, a gear operatively connected to the pinion, a shaft on which the gear is mounted, a spider mounted on the shaft, an indicating drum attached to the spider, a gear mounted on the spider and meshing with the first named gear, a second gear loosely mounted on the shaft, a correction dial attached to the second gear, a gear mounted on the spider and meshing with the second gear, and means for turning the second gear to move the correction dial and spider to alter the setting of the indicating dial independently of the first named gear.

14. In a calculating instrument, the combination of a casing, a frame within the casing, a shaft mounted in the frame, means for actuating the shaft, a cam member having the general curvature of a curve of a chart plotted with respect to mutually perpendicular coordinate axes, a slidable member to which the cam member is connected, a guide for the slidable member, a slotted arm pivoted to the frame, a pin attached to the slidable member and extending within the slot and the arm, means for swinging the arm to displace the cam member in accordance with one coordinate of a point on the chart, means for displacing the slidable member in accordance with another coordinate of the point on the chart, a connection between the slidable member and the cam member whereby such displacement of the slidable member produces a displacement of the cam member, a rack bar connected to the cam member, a pinion coacting with the rack bar, means for indicating the resultant displacement of the cam member, and operating connections between the pinion and the indicating means.

15. In a deflection converter for use with a range keeper provided with a deflection dial having a correction ring associated therewith, the combination of a gear associated with the ring, a shaft operatively connected to the gear, a casing adapted to be attached to the range keeper, a shaft mounted in the casing, means for connecting the shaft in operative relation to the shaft of the range keeper, a cam member having the shape of the drift curve of a projectile, a member to which the cam member is connected, an arm pivoted to the casing, a connection between the arm and the member to which the cam member is connected, a connection between the arm and the shaft whereby the arm may be moved in accordance with the indications of the deflection dial of the range keeper to produce a corresponding displacement of the member which is connected to the cam member and the cam member, means whereby the cam member may be displaced in accordance with the range as indicated by the range keeper, a drum graduated in units of range operatively connected to the last named means, and means whereby the resultant displacement of the cam member in accordance with deflection and range gives an indication of arbitrary deflection.

16. In a deflection converter for use with a range keeper provided with a deflection dial having a correction ring associated therewith, the combination of a gear associated with the ring, a shaft operatively connected to the gear, a casing adapted to be attached to the range keeper, a shaft mounted in the casing, means for connecting the shaft to the shaft of the range keeper, a cam member having the shape of a drift curve of a projectile, a member to which the cam member is connected, an arm pivoted to the casing, a connection between the arm and the member to which the cam member is connected, a connection between the arm and the shaft whereby the arm may be moved in accordance with the indications of the deflection dial of the range keeper, means whereby the member connected to the cam member may be displaced in accordance with the range as indicated by the range keeper, an indicating device graduated in units of range operatively connected to the means for moving the member connected to the cam member, means for indicating the arbitrary deflection, means whereby the indicating means may be moved in accordance with the resultant displacement of the cam member according to deflection and range, a spotting correction device associated with the indicating means, and means whereby displacement of the correction device produces a displacement of the indicating means in accordance with the spotting correction which should be applied.

17. In a deflection converter for use with a range keeper provided with a deflection dial, the combination of a casing, a shaft mounted in the casing, means for connecting the shaft in operative relation to the deflection dial of the range keeper, a member provided with a slot having the shape of the drift curve of a projectile plotted with respect to mutually perpendicular coordinate axes, means connected to the shaft and movable parallel to one of the coordinate axes for moving the slotted member in accordance with the indications of the deflection dial of the range keeper, means movable along the other coordinate axis for displacing the slotted member in accordance with the range as indicated by the range keeper, and means whereby the resultant displacement of the slotted member in accordance with deflection, range and drift gives an indication in terms of units of arbitrary deflection.

18. In a deflection converter for use with a range keeper provided with a deflection dial, the combination of a casing, a shaft mounted in the casing, means for connecting the shaft in operative relation to the deflection dial of the range keeper, a member provided with a slot having the shape of the drift curve of a projectile, means connected to the shaft for moving the slotted member in accordance with the indications of the deflection dial of the range keeper, means for displacing the slotted member in accordance with the range as indicated by the range keeper, means whereby the resultant displacement of the slotted member in accordance with deflection and range gives an indication in terms of units of arbitrary deflection, and means for applying a spotting correction to the means for indicating arbitrary deflection.

19. In a deflection converter for use with a range keeper provided with a deflection dial having a correction ring associated therewith, the combination of a gear associated with the ring, a shaft operatively connected to the gear, a casing adapted to be attached to the range keeper, a frame within the casing, a shaft mounted in the frame, means for operatively connecting the shaft to the shaft of the range keeper, a plate provided with a slot having the shape of the drift curve of a projectile, a slide to which the plate is connected, a guide for the slide, an arm pivoted to the frame, a connection between the arm and the slide, a connection between the arm and the shaft whereby the arm may be moved in accordance with the indications of the deflection dial of the range keeper to produce a corresponding movement of the slide and the plate, a rack bar connected to the guide, means for displacing the rack bar in accordance with the range as indicated by the range keeper, a drum graduated in units of range operatively connected to the means for moving the slide, a drum graduated in units of arbitrary deflection, a rack attached to the plate, a pinion cooperating with the rack, and operating connections between the pinion and the arbitrary deflection drum whereby the latter may be displaced in accordance with the resultant displacement of the plate to give an indication of the arbitrary deflection corresponding to the given deflection and range.

20. In a deflection converter for use with a range keeper provided with a deflection dial, the combination of a shaft operatively related to the deflection dial, a cam member having the shape of the drift curve of a projectile plotted with respect to mutually perpendicular coordinate axes, operating connections between the cam member and the shaft of the range keeper whereby the member may be displaced along one of the coordinate axes in accordance with the deflection dial of the range keeper, means whereby the cam member may be displaced along the other coordinate axis in accordance with the range as indicated by the range keeper, an indicating device graduated in units of arbitrary deflection, and means whereby the resultant displacement of the cam member operates the indicating device to show the arbitrary deflection corresponding to the given deflection, range and drift.

21. In a deflection converter for use with a range keeper provided with a deflection dial, the combination of a shaft operatively related to the deflection dial, a cam member having the shape of the drift curve of a projectile plotted with respect to mutually perpendicular coordinate axes, operating connections between the cam member and the shaft of the range keeper whereby the member may be displaced along one of the coordinate axes in accordance with the deflection as indicated by the deflection dial of the range keeper, means whereby the cam member may be displaced along the other coordinate axis in accordance with the range as indicated by the range keeper, an indicating device graduated in units of arbitrary deflection, means whereby the resultant displacement of the cam member operates the indicating device to show the arbitrary deflection corresponding to the given deflection and range, a correction device associated with the indicating device, means for actuating the correction device, and means operatively connecting the correction device to the indicating device to move the latter in accordance with the correction which should be applied independently of its movement in accordance with the resultant displacement of the cam member.

22. In a deflection converter for use with a range keeper provided with a dial for indicating actual deflection and a correction ring associated with the dial, the combination of a gear associated with the correction ring, a shaft operatively connected to the gear, a casing adapted to be attached to the range keeper, a frame within the casing, a shaft mounted in the frame, means for connecting the shaft in operative relation to the shaft of the range keeper, a cam member having the shape of a drift curve of a projectile, a slide to which the cam member is connected, an arm pivoted to the frame, a connection between the arm and the slide, a connection between the arm and the shaft whereby the arm may be moved in accordance with the actual deflection as indicated by the dial of the range keeper, means for displacing the slide in accordance with the range as indicated by the range keeper, a rack attached to the cam member, a pinion cooperating with the rack, a gear operatively connected to the pinion, a shaft on which the gear is mounted, a spider mounted on the shaft, an indicating drum graduated in units of arbitrary deflection attached to the spider, a gear mounted on the spider and meshing with the first named gear, a second gear loosely mounted on the shaft, a spotting correction dial attached to the second gear, a gear mounted on the spider and meshing with the second gear, and means for turning the second gear to move the correction dial and spider to alter the setting of the arbitrary deflection drum independently of the first named gear.

In testimony whereof I affix my signature.

HANNIBAL C. FORD.